US008354960B2

(12) United States Patent
Krich et al.

(10) Patent No.: US 8,354,960 B2
(45) Date of Patent: Jan. 15, 2013

(54) METHOD FOR LOW SIDELOBE OPERATION OF A PHASED ARRAY ANTENNA HAVING FAILED ANTENNA ELEMENTS

(75) Inventors: Steven Ira Krich, Lexington, MA (US); Cory J. Prust, Waukesha, WI (US); Ian Weiner, Braintree, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 127 days.

(21) Appl. No.: 13/070,688

(22) Filed: Mar. 24, 2011

(65) Prior Publication Data

US 2011/0241941 A1 Oct. 6, 2011

Related U.S. Application Data

(60) Provisional application No. 61/319,911, filed on Apr. 1, 2010.

(51) Int. Cl.
*G01S 3/28* (2006.01)

(52) U.S. Cl. ........................................................ 342/379

(58) Field of Classification Search ................... 342/379
See application file for complete search history.

(56) References Cited

U.S. PATENT DOCUMENTS 7,336,232 B1 * 2/2008 Lee et al. ...................... 343/754
8,049,661 B1 * 11/2011 Loberger ...................... 342/173
2006/0181456 A1 8/2006 Dai et al.
2007/0126630 A1 6/2007 Coppi et al.
2007/0205943 A1 9/2007 Nassiri-Toussi et al.
2010/0066634 A1 3/2010 Derneryd et al.

OTHER PUBLICATIONS

International Search Report and Written Opinion in related international patent application No. PCT/US2011/029734 mailed on Nov. 15, 2011, 9 pages.

Er, M H, "Array Pattern Synthesis in the Presence of Element Failure", Proc. International Symposium on Antennas and Propagation, Japan, pp. 9-12, Sep. 1992.

Horiki, Yasutaka et al., "A Self-Calibration Technique for a DOA Array With Near-Zone Scatterers", IEEE Transactions on Antennas and Propagation, Apr. 2006, vol. 54, No. 4, pp. 1162-1166.

(Continued)

*Primary Examiner* — Harry Liu

(74) *Attorney, Agent, or Firm* — Guerin & Rodriguez, LLP; William G. Guerin

(57) ABSTRACT

Described is a method of modifying an antenna pattern for a phased array antenna having at least one failed antenna element. A number of proximate beamformers in a proximate angular region about a beamformer at an angle of interest are determined. Each of the proximate beamformers has a proximate beamformer weight vector. A corrected beamformer weight vector is determined for the angle of interest as a linear combination of the proximate beamformer weight vectors. Each element of the corrected beamformer weight vector that corresponds to one of the failed antenna elements has a value of zero. The method enables computation of low spatial sidelobe antenna patterns without requiring a recalibration of the antenna thereby enabling uninterrupted operation of systems that employ phased array antennas. The method can also be used to control taper loss or sidelobe level for phased array antennas that have no failed antenna elements.

24 Claims, 13 Drawing Sheets

OTHER PUBLICATIONS

Keizer, Will P. M. N., "Element Failure Correction for a Large Monopulse Phased Array Antenna With Active Amplitude Weighting", IEEE Transactions on Antennas and Propagation, Aug. 2007, vol. 55, No. 8, pp. 2211-2218.

Lee, K.M. et al., "A Built-In Performance Monitoring/Fault Isolation and Correction (PM/FIC) System for Active Phased Array Antennas", IEEE, 1993, pp. 206-209.

Liu, S.C., "A Fault Correction Technique for Phased Array Antennas", IEEE, 1992, pp. 1612-1615.

Peters, Timothy J., "A Conjugate Gradient-Based Algorithm to Minimize the Sidelobe Level of Planar Arrays with Element Failures", IEEE Transactions on Antennas and Propagation, Oct. 1991, vol. 39, No. 10, pp. 1497-1504.

Robey, Frank C. et al., "Array Calibration and Modeling of Steering Vectors", IEEE, 2001, pp. 1121-1126.

Wright, P.J. et al, "Re-Optimisation of Linear and Planar Arrays with Failed Elements", Antennas and Propagation, Apr. 4-7, 1995, pp. 81-84.

Yang, Yongyi, et al, "Design of Self-Healing Arrays Using Vector-Space Projections", IEEE Transactions on Antennas and Propagation, Apr. 2001, vol. 49, No. 4, pp. 526-534.

Zainud-Deen, S.H. et al, "Array Failure Correction with Orthogonal Method", 21st National Radio Science Conference, Mar. 16-18, 2004; 9 pages.

* cited by examiner

METHOD FOR LOW SIDELOBE OPERATION OF A PHASED ARRAY ANTENNA HAVING FAILED ANTENNA ELEMENTS

RELATED APPLICATION

This application claims the benefit of U.S. Provisional Application Ser. No. 61/319,911 filed Apr. 1, 2010 and titled "Maintaining Low Sidelobes in a Phased Array Antenna with Failed Antenna Elements." The entire teachings of the above application are incorporated herein by reference.

GOVERNMENT RIGHTS IN THE INVENTION

This invention was made with government support under grant number FA8721-05-C-0002 awarded by the Air Force. The government has certain rights in this invention.

FIELD OF THE INVENTION

The present invention relates generally to the operation of phased array antennas. More particularly, the invention relates to methods of operating a phased array antenna having one or more failed antenna elements.

BACKGROUND OF THE INVENTION

In many systems employing phased array antennas, operation with a low spatial sidelobe antenna pattern is required. By way of example, these systems include radar systems, communication systems and sonar systems. If one or more antenna elements fail to operate, satisfactory operation may still be possible as long as the antenna patterns for each of the individual elements in the array is known with sufficient accuracy. Accurate knowledge of the individual antenna patterns permits a low spatial sidelobe antenna pattern to be computed despite the presence of failed antenna elements. If the array antenna patterns are not accurately known, computation of the low sidelobe antenna patterns cannot be performed and satisfactory operation of the phased array antenna is typically not possible.

SUMMARY

In one aspect, the invention features a method of modifying an antenna pattern for a phased array antenna having a failed antenna element. The method includes determining a plurality of proximate beamformers in a proximate angular region about a beamformer that is defined at an angle of interest and has at least one failed antenna element. Each proximate beamformer has a proximate beamformer weight vector. A corrected beamformer weight vector at the angle of interest is determined as a linear combination of the proximate beamformer weight vectors. Each element of the corrected beamformer weight vector that corresponds to one of the failed antenna elements has a value of zero.

In another aspect, the invention features a method of modifying an antenna pattern of a phased array antenna having a failed antenna element. The method includes determining, for a beamformer having low sidelobes and defined for an angular direction θ, a corrected beamformer. At least one antenna element in a plurality of antenna elements coupled to the beamformer is a failed antenna element. The corrected beamformer has a corrected beamformer weight vector $\hat{w}(\theta)$ for the angular direction θ defined as $$\hat{w}(\theta) = \sum_{i=-k}^{k} a_i \; w(\theta_i)$$

where $w(\theta_i)$ represents a beamformer weight vector for each proximate beamformer in a plurality of proximate beamformers that have low sidelobes and are within a proximate angular region of the angular direction θ. Each element in the corrected beamformer weight vector $\hat{w}(\theta)$ that corresponds to a one of the failed antenna elements has a value of zero.

In still another aspect, the invention features a method of determining a modified beamformer for a phased array antenna. A target value for a change in an average sidelobe estimate for the modified beamformer is selected and a value for a maximum taper loss for the modified beamformer is selected. The modified beamformer is determined as a linear combination of a number of proximate beamformers defined in the absence of failed antenna elements. A change in the average sidelobe estimate is determined based on the modified beamformer. If the change in the average sidelobe estimate for the modified beamformer exceeds the selected target value, the steps of determining the modified beamformer and determining the change in the average sidelobe estimate are repeated until the change in the average sidelobe estimate does not exceed the selected target value. The number of proximate beamformers used to determine the modified beamformer is increased for each repetition of the steps of determining the modified beamformer and determining the change in the average sidelobe estimate. If the taper loss for the modified beamformer exceeds the selected value for the maximum taper loss, the steps of determining the modified beamformer, determining the change in the average sidelobe estimate and determining if the change in the average sidelobe estimate exceeds the selected target value are repeated for an increased number of proximate beamformers until the taper loss for the modified beamformer does not exceed the selected value for the maximum taper loss.

In yet another aspect, the invention features a method of determining a modified beamformer for a phased array antenna. A target value for a taper loss for the modified beamformer is selected and a maximum value for a change in an average sidelobe estimate for the modified beamformer is selected. The modified beamformer is determined as a linear combination of a number of proximate beamformers defined in the absence of failed antenna elements. The taper loss is determined based on the modified beamformer. If the taper loss for the modified beamformer exceeds the selected target value, the steps of determining the modified beamformer and determining the taper loss are repeated until the change in the average sidelobe estimate does not exceed the selected target value. The number of proximate beamformers used to determine the modified beamformer is increased for each repetition of the steps of determining the modified beamformer and determining the taper loss. If the change in the sidelobe estimate for the modified beamformer exceeds the maximum value, the steps of determining the modified beamformer, determining the taper loss and determining if the change in the sidelobe estimate exceeds the maximum value are repeated for an increased number of proximate beamformers until the change in the sidelobe estimate for the modified beamformer does not exceed the maximum value.

In yet another aspect, the invention features a computer program product for determining a modified antenna pattern for a phased array antenna having a failed antenna element. The computer program product includes a computer readable storage medium having computer readable program code embodied therein. The computer readable program code includes computer readable program code configured to determine a plurality of proximate beamformers in a proximate angular region about a beamformer at an angle of interest and having at least one failed antenna element. Each of the proximate beamformers has a proximate beamformer weight vector. The computer readable program code also includes computer readable program code configured to determining a corrected beamformer weight vector at the angle of interest as a linear combination of the proximate beamformer weight vectors, each element of the corrected beamformer weight vector corresponding to one of the failed antenna elements having a value of zero.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
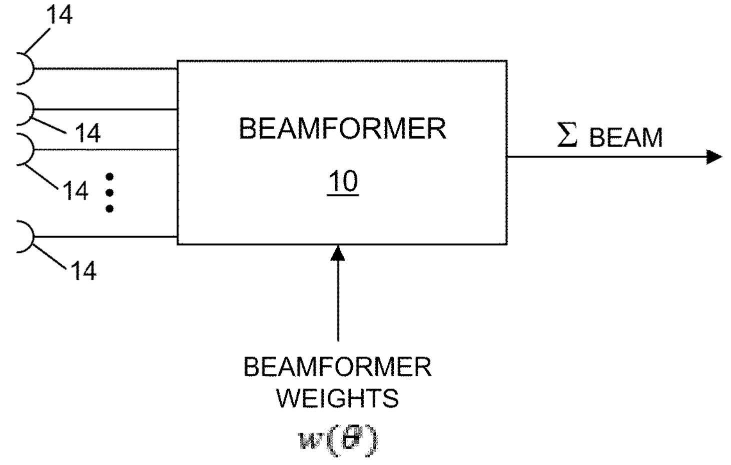
FIG. 1 is a block diagram of a digitally controlled beamformer.

The performance of a phased array antenna typically degrades significantly when one or more of the antenna elements fail to operate. In particular, it can be difficult to achieve spatial antenna patterns having low sidelobes. Satisfactory operation may be possible if the array individual antenna element patterns are accurately known so that low spatial sidelobe antenna patterns can be computed and generated despite the presence of failed antenna elements.

In some phased array antennas the individual antenna element patterns are not accurately known; however, low sidelobe beamformers that have no failed antenna elements are known. The following description is directed primarily to a phased array antenna having a number n of antenna elements and for which the array antenna element patterns are not accurately known. Thus the true steering vector $v_t(\theta)$ to an angle $\theta$ is not accurately known. The unknown antenna calibration errors $\epsilon(\theta)$ limit the ability to compute low sidelobe antenna patterns to the desired level. An assumed steering vector $v_a(\theta)$ that is equal to the sum of the true steering vector $v_t(\theta)$ and the antenna calibration error $\epsilon(\theta)$ for the angle $\theta$ is known. In addition, a beamformer weight vector $w(\theta)$ for a low sidelobe beamformer is known, where the inner product $\langle w(\theta), v_t(\theta+\phi)\rangle$ (unit normed vectors are assumed) of the weight vector $w(\phi)$ and true steering vector $v_t(\theta)$ is small for a value of $\phi$ in the sidelobe region. The sidelobe region encompasses the angles in which low sidelobes are desired and is always outside the null-to-null beamwidth of the mainlobe.

In brief overview, aspects of the invention relate to a method for modifying an antenna pattern of a phased array antenna having at least one failed antenna element. In various embodiments, the method enables determination of a weight vector for a corrected beamformer to enable generation of a low spatial sidelobe antenna pattern despite the presence of the one or more failed antenna elements. The method allows for computing these low spatial sidelobe antenna patterns without requiring a recalibration of the antenna thereby enabling uninterrupted operation of various types of systems that employ phased array antennas. In other embodiments, the method allows control of taper loss or sidelobe level for phased array antennas having no failed antenna elements.

The method is particularly suited for a phased array antenna where the failure of an antenna element has no significant effect on the antenna patterns of neighboring antenna elements. For example, the phased array antenna may be constructed to provide constant impedance at an antenna element port regardless of whether or not the antenna element has failed. Thus the mutual coupling between antenna elements is substantially unaffected by the failure of antenna elements.

As will be appreciated by one skilled in the art, aspects of the present invention may be embodied not only as a method, but also as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, MATLAB, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to various embodiments of the method of the invention, the weight vector for a low sidelobe beamformer for a phased array having one or more failed elements, referred to herein as a corrected beamformer weight vector $\hat{w}(\theta)$, is determined as a linear combination of weight vectors for certain low sidelobe beamformers $w(\theta_i)$, given by $$\hat{w}(\theta) = \sum_{i=-k}^{k} a_i \, w(\theta_i),$$

where 2k+1 is the total number K of beamformers used to create the corrected beamformer weight vector $\hat{w}(\theta)$ and $w(\theta_i)$ are proximate weight vectors for beams with low sidelobes and no failed elements. Choosing an odd number of beams K symmetrically surrounding and including the direction of interest generally achieves better performance. However, when these beams are not available, K does not need to be odd and the beams do not need to be symmetrically selected.

Methods for determining low sidelobe beamformers are described, for example, in U.S. patent application Ser. No. 13/070,566, titled "Iterative Clutter Calibration (ICC) with Phased Array Antennas" and filed concurrently with this application in which digitally-controlled analog beamformers in an airborne phased array radar are iteratively adjusted during a calibration flight until sidelobe clutter power is minimized or reduced to an appropriate level. Consequently, the beamformers are determined for low sidelobe antenna patterns without accurately knowing the individual antenna element patterns.

The method to achieve a low spatial sidelobe antenna pattern in the presence of one or more failed antenna elements in a phased array antenna according to principles of the invention will be shown to achieve a near optimal solution even if the individual antenna element patterns are accurately known. Thus for some systems, in particular where a rapid recalculation of the beamformer weight vector with failed elements is required, it may be preferable to use the method of the invention even if $v_t(\theta)$ is accurately known.

FIG. 1 is a block diagram illustrating how a digitally controlled beamformer 10 processes the signals received at a number n of antenna elements 14 in an array to effectively produce a single $\Sigma_{BEAM}$ corresponding to a beam for an angle θ. The beamformer 10 is a fully-digital beamformer if the n signals from the antenna elements 14 are digital signals. Conversely, the beamformer 10 is an analog beamformer if the n signals are analog signals.

The following method can be used if the antenna element patterns are known with sufficient accuracy to achieve the desired sidelobe level. The weight vector $\hat{w}(\theta)$ for a low sidelobe beamformer with no failed antenna elements can be determined as $$\hat{w}(\theta)=\mu R(\theta)^{-1}v_a(\theta) \quad (1a)$$

where R (θ) is a modeled covariance matrix with sidelobe interference given by $$R(\theta)=[(1-\gamma)I+\gamma M(\theta)] \quad (1b)$$

and where the modeled interference covariance with no noise M(θ) is given by $$M(\theta)=\frac{1}{L}\sum_{|\beta_i-\theta|>\Delta} v_a(\beta_i)v_a(\beta_i)^H \quad (1c)$$

I is an identity matrix representing the thermal noise, $0\leqq\gamma\leqq1$ describes the mixture of modeled interference to thermal noise, 2Δ is the width of the mainlobe of the antenna pattern, L is the number of terms in the sum, μ is a normalizing scale factor making $\hat{w}(\theta)$ unit norm and H denotes the Hermitian transpose.

If the array has failed antenna elements, Equations 1a, 1b and 1c can be modified to delete the rows and columns of R(θ) and $v_a(\theta)$ corresponding to the location of the failed elements. The method fails to achieve low sidelobes regardless of whether or not failed antenna elements are present if the individual antenna element patterns have significant calibration errors. The methods of the invention described below primarily address situations in which a combination of at least one failed element and large calibration errors exist.

Figure 2:
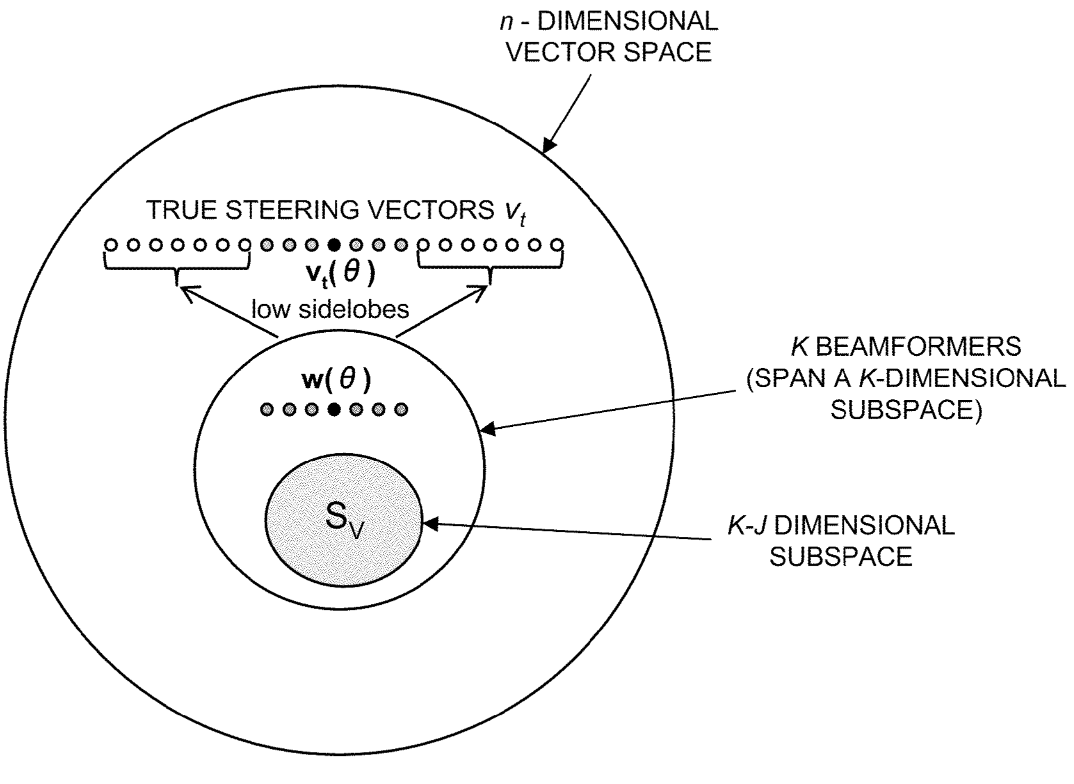
FIG. 2 is a graphical representation of low sidelobe beamformers that are a subset of beamformers within an n-dimensional vector space.

In one embodiment of a method for forming an antenna pattern with an array antenna having a failed antenna element according to the invention, a number K of low sidelobe beamformers $w(\theta_i)$ for i=1, 2, . . . K defined with no failed elements, and which are proximate to an angle of interest θ are determined. FIG. 2 graphically illustrates how the K low sidelobe beamformers are a subset of beamformers determined from beamformers within an n-dimensional vector space. Preferably, the beamformers in the subset are closely spaced, for example, with beamformers being separated from "adjacent beamformers" by less than a beamwidth. In some embodiments, the spacing between adjacent beamformers is one-half a beamwidth. A matrix $W_K$ is formed with the $w(\theta_i)$ for i=1, 2, . . . K as columns.

By way of example, J is a number of failed antenna elements where J is an integer that is less than the number K of low sidelobe beamformers. D is a vector describing the location of the failed elements. Within the space spanned by $W_K$ is a subspace $S_V$ of dimension K−J where all vectors in $S_V$ have a value of zero at the locations corresponding to the failed antenna elements.

$W_K(D,:)$ is a J×K matrix of only the rows of the matrix $W_K$ that have failed antenna elements. The K×(K−J) matrix, expressed in MATLAB notation as null($W_K$(D,:)), is an orthonormal basis for the null space of $W_K(D,:)$ obtained from the singular value decomposition. Stated alternatively, $W_K(D,:)[\text{null}(W_K(D,:))]$ is a J×(K−J) matrix of zeroes and thus $$V=W_K[\text{null}(W_K(D,:))] \quad (2)$$

is an n×(K−J) matrix with zeroes along the rows corresponding to the location of the J failed elements. The subspace spanned by the columns of V is the subspace $S_V$ shown in FIG. 2. The solution for the corrected beamformer weight vector $\hat{w}(\theta)$ is constrained to the subspace $S_V$, thus Equation 1a can be modified as follows:

$$\begin{aligned}\hat{w}(\theta) &= \mu V[V^H R(\theta)V]^{-1}V^H v_a(\theta)\\ &= \mu V[(1-\gamma)V^H V+\gamma V^H M(\theta)V]^{-1}V^H v_a(\theta)\end{aligned}$$

Equation 3 can be used directly if M(θ) is known with sufficient accuracy; however, if the calibration errors are too large to provide a good estimate for the modeled interference covariance with no noise M(θ), the term $V^H M(\theta)V$ can be shown to be well approximated by αI where α is the average sidelobe level achieved by the beamformers in $W_K$. Thus the solution for the corrected beamformer weight vector $\hat{w}(\theta)$ according to Equation 3 can be expressed as $$\hat{w}(\theta)=\mu V[(1-\gamma)V^H V+\gamma\alpha I]^{-1}V^H v_a(\theta) \quad (4)$$

where, in the transformed space, $V^H V$ is the correlated thermal noise and αI is the interference covariance estimate. To simplify the form of this equation one can substitute $\tilde{\gamma}=\alpha\gamma/(1-\gamma+\alpha\gamma)$, yielding $$\hat{w}(\theta)=\tilde{\mu}V[(1-\tilde{\gamma})V^H V+\tilde{\gamma}I]^{-1}V^H v_a(\theta) \quad (5)$$

where $\tilde{\mu}=\mu/(1-\gamma+\alpha\gamma)$ is the new normalization constant. In determining the parameters K and $\tilde{\gamma}$ it is useful to have an estimate for the change in the taper loss and the average sidelobes. Without significant calibration errors, the taper loss estimate expressed in dB is given by $10\log_{10}|\hat{w}(\theta)^H v_a(\theta)|^2\leqq0$ where both $\hat{w}(\theta)$ and $v_a(\theta)$ are unit normed. The average sidelobes can be estimated based on $\hat{w}(\theta)=Vc$ where c is a K−J vector of coefficients for combining the columns of matrix V. Thus the change in the average sidelobe estimate $\Delta SL_{est}$ is given by $$\begin{aligned}\Delta SL_{est}(\hat{w}(\theta)) &= \hat{w}(\theta)^H M(\theta)\hat{w}(\theta)/\alpha \\ &= c^H V^H M(\theta)Vc/\alpha \\ &= |c|^2\end{aligned} \tag{6}$$

based on the approximation $V^H M(\theta)V=\alpha I$.

As previously described, $\tilde{\gamma}$ describes the amount of modeled interference relative to thermal noise. A value of zero for $\tilde{\gamma}$ in Equation 5 refers to a projection onto the space spanned by the columns of V that can yield low sidelobes because all columns of V have relatively low sidelobes; however, when combining several vectors, the sidelobes can increase. For a fixed K, $\tilde{\gamma}$ equal to zero yields the lowest taper loss and the highest sidelobes. Increasing the value of $\tilde{\gamma}$ has the effect of regularizing the matrix $V^H V$ by reducing the contribution the eigenvectors corresponding to the small eigenvalues of $V^H V$. The lowest sidelobes and greatest taper loss are obtained for the value of $\tilde{\gamma}$ equal to one. Importantly when searching for a good value for $\gamma$, as the value of $\tilde{\gamma}$ increases, the change in the average sidelobe estimate $\Delta SL_{est}$ monotonically decreases and the taper loss monotonically increases (i.e., performance defined by taper loss degrades).

Tradeoffs can be made between taper loss, sidelobe level and/or mainbeam region when determining the corrected beamformer weights $\hat{w}(\theta)$. Parameter selections are determined in part according to the properties most important to a particular application. Parameter selections are simplified based on the monotonic properties discussed above. More specifically, the value of K affects the width of the mainbeam region. The coefficients of the linear combination of proximate beamformers are approximately the corrected pattern gain at the corresponding look directions. Consequently, a larger value for K results in a wider mainbeam region evident as a wider mainlobe or increased first sidelobes. Advantageously, even with antenna calibration errors, the shape of the resulting mainbeam region is predictable and can be adjusted in some instances according to the needs of the particular application.

Figure 3:
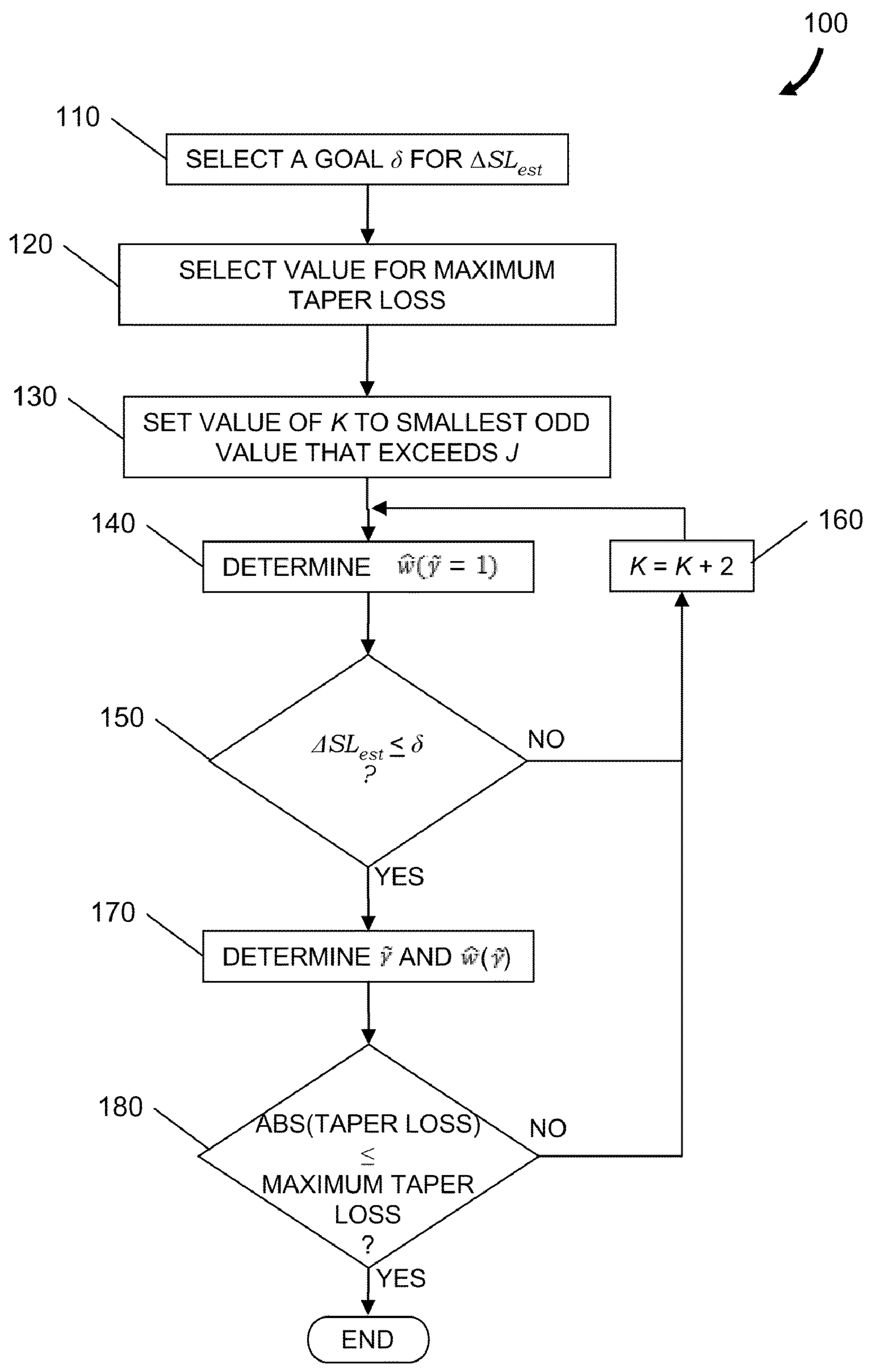
FIG. 3 shows a flowchart representation of an embodiment of a method for modifying an antenna pattern of a phased array antenna according to the invention.

Referring to FIG. 3, a flowchart representation of an embodiment of a method 100 for modifying an antenna pattern of a phased array antenna according to the invention is shown. A target value (i.e., a goal) $\delta$ for the change in the average sidelobe estimate $\Delta SL_{est}$ and a value for a maximum acceptable taper loss (expressed as a positive number) are selected (steps 110 and 120, respectively). A value of one for the change $\delta$ corresponds to no change in the average sidelobe estimate. The method 100 determines the parameters corresponding to the narrowest mainbeam region that satisfies the specified constraints. The number K of proximate beamformers to use in calculating the corrected beamformer $\hat{w}$ is initialized (step 130) at the smallest odd value of K that is greater than the number J of failed elements and $\hat{w}(\tilde{\gamma}=1)$ is determined (step 140). Although not required, limiting K to an odd value ensures that symmetric proximate beamformers around the beamformer of interest are used and the resulting beam pattern within the mainlobe is more symmetric around the peak. If it is determined (step 150) that the change in the average sidelobe estimate $\Delta SL_{est}$ exceeds the target value $\delta$, the value of K is increased (step 160) by two and $\hat{w}(\tilde{\gamma}=1)$ is again determined (step 140) until $\Delta SL_{est}$ is determined (step 150) to be less than or equal to the target value $\delta$. Once an appropriate K is determined, a single variable search of a monotonic function determines (step 170) a value for $\tilde{\gamma}$, $0 \leqq \tilde{\gamma} \leqq 1$, with $\Delta SL_{est}$ equal to the selected change 5. If the resulting beamformer weights $\hat{w}$ are determined (step 180) to satisfy the taper loss requirement (i.e., the absolute value of the taper loss expressed in dB is less than the maximum taper loss), the method 100 is complete, otherwise the method 100 returns to step 160 to increase the value of K and the subsequent steps are repeated.

Figure 4:
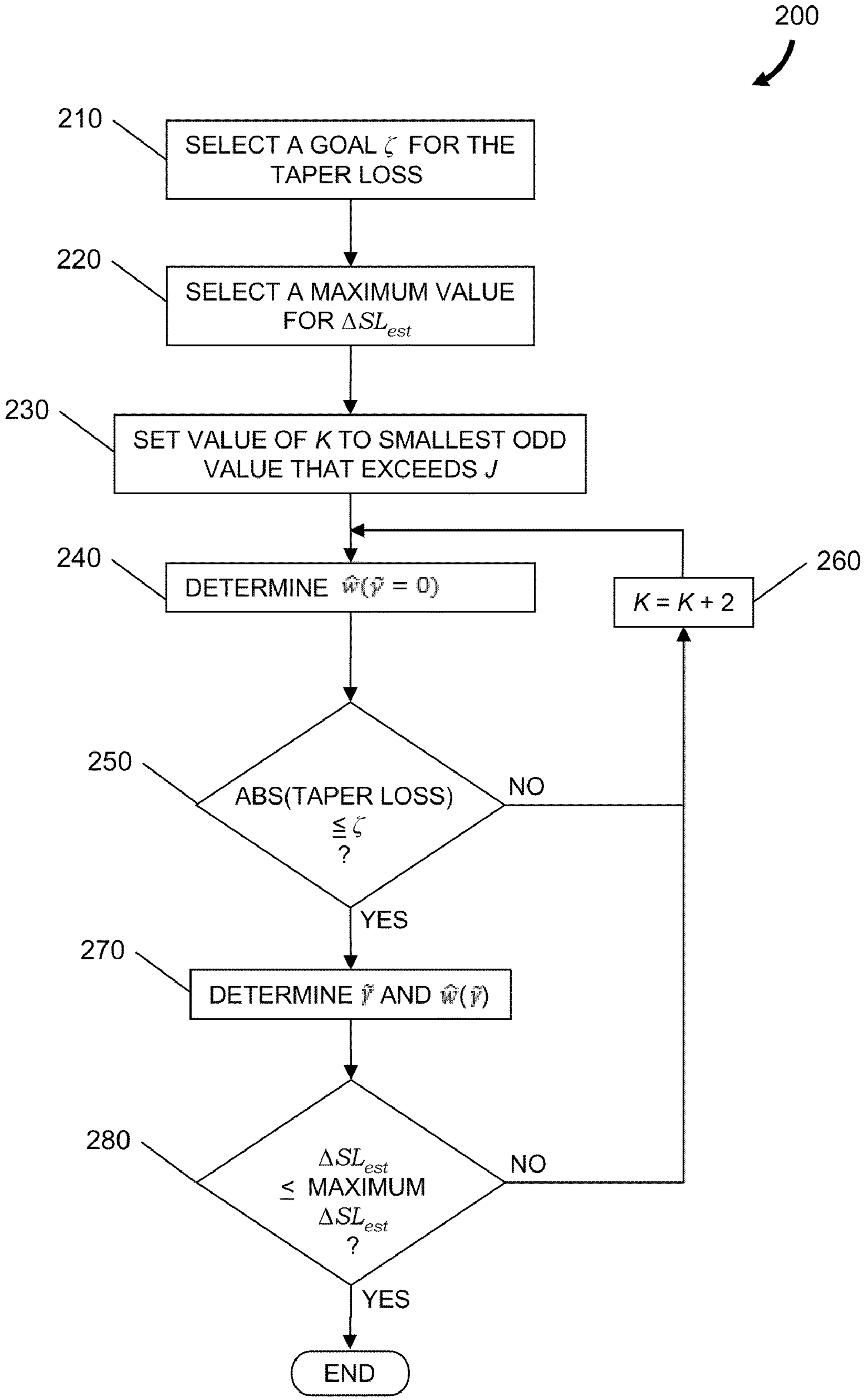
FIG. 4 shows a flowchart representation of another embodiment of a method for modifying an antenna pattern of a phased array antenna according to the invention.

Referring to FIG. 4, a flowchart representation of another embodiment of a method 200 for modifying an antenna pattern of a phased array antenna according to the invention is shown. A target value $\zeta$ for the taper loss and a maximum value for the change in the average sidelobe estimate $\Delta SL_{est}$ are selected (steps 210 and 220, respectively). The number K of proximate beamformers to use in calculating the corrected beamformer is initialized (step 230) at the smallest odd value of K that is greater than the number J of failed elements and $\hat{w}(\tilde{\gamma}=0)$ is determined (step 240). Again, an odd value for K ensures that calculations are made using symmetric proximate beamformers around the beamformer of interest. If it is determined (step 250) that the absolute value of the taper loss is greater than $\zeta$, K is increased (step 260) until the absolute value of the taper loss equals or is less than the specified value $\zeta$ to meet the requirement. Once a value for K is found that satisfies the taper loss requirement, a single variable search of a monotonic function determines (step 270) a value for $\tilde{\gamma}$, $0 \leqq \tilde{\gamma} \leqq 1$, for a taper loss that is equal to the specified value $\zeta$. If the resulting $\hat{w}$ is determined (step 280) to satisfy the average sidelobe estimate $\Delta SL_{est}$ requirement, the method 200 is complete, otherwise the method 200 returns to step 260 to increase the value of K.

If the selected values (steps 110 and 120 for method 100 or steps 210 and 220 for method 200) are too stringent, K increases to an unacceptably large value and an acceptable solution may not be found. In such instances the method 100 or 200 is re-initiated with a selection of new parameter values. Advantageously, the numerical solutions to find $\tilde{\gamma}$ are efficiently determined due to the monotonic relationships described above.

Examples Based on a 64 Element Uniform Linear Array

The following examples show the results from applying the method of the invention to a variety of test cases. Each test case is based on an assumed array of steering vectors, $v_a(\theta)$, from a perfect uniform linear array having 64 array elements indexed sequentially by position and referred to as elements 1 to 64. The vector of calibration errors $\epsilon(\theta)$ changes with $\theta$ and results in the true array steering vectors having perturbations from the perfect uniform linear array. The calibrations errors $\epsilon(\theta)$ limit the beamformer sidelobes based solely upon the assumed steering vectors $v_a(\theta)$ to −30 dB. It is assumed that beamformer weight vectors $w(\theta)$ that can achieve −50 dB sidelobes are available. The beams in $W_K$ are spaced by one half beamwidth.

Figure 5:
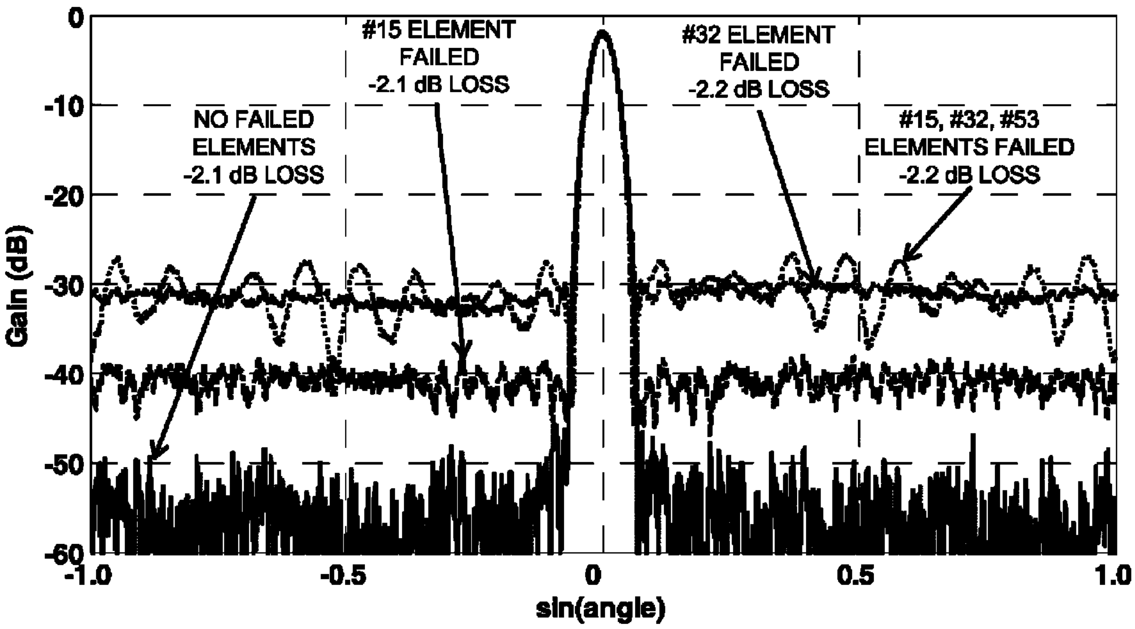
FIG. 5 shows examples of antenna patterns that result according to four conditions for a 64 element linear array.

FIG. 5 depicts the antenna patterns that result according to four conditions for the 64 element linear array: no failed antenna elements, element 15 failed, element 32 failed, and elements 15, 32 and 53 failed. The taper loss values shown for each condition are relative to the true array steering vectors $v_t(\theta)$.

Figure 6A:
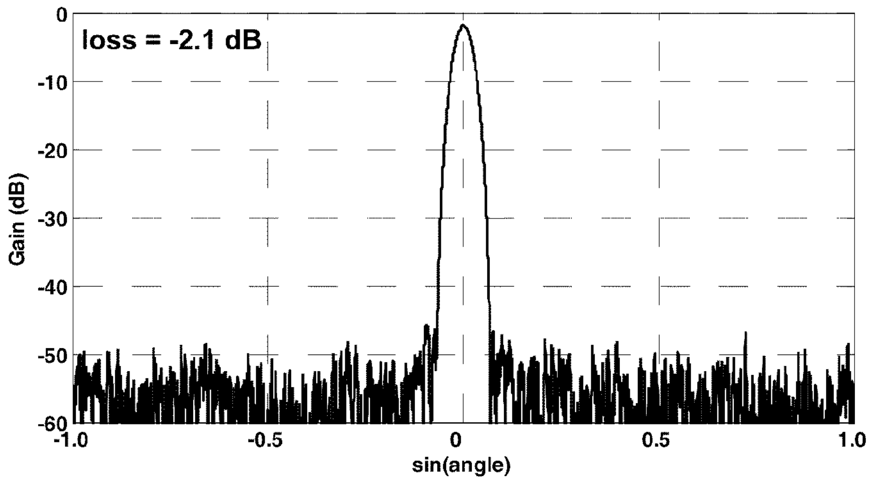
FIGS. 6A, 6B and 6C illustrate an antenna pattern for no failed antenna elements, an optimum antenna pattern achievable with a single failed element, #15, and a corrected antenna pattern achieved using the method of FIG. 3, respectively.
Figure 6B:
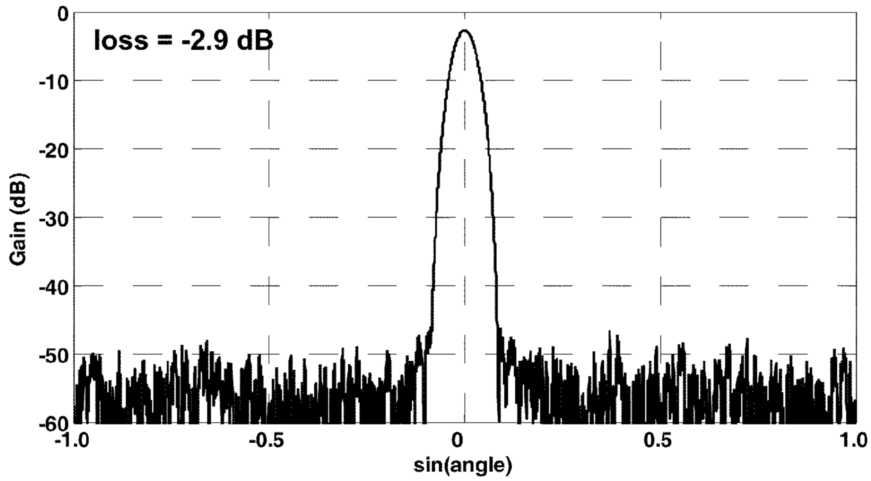
Figure 6C:
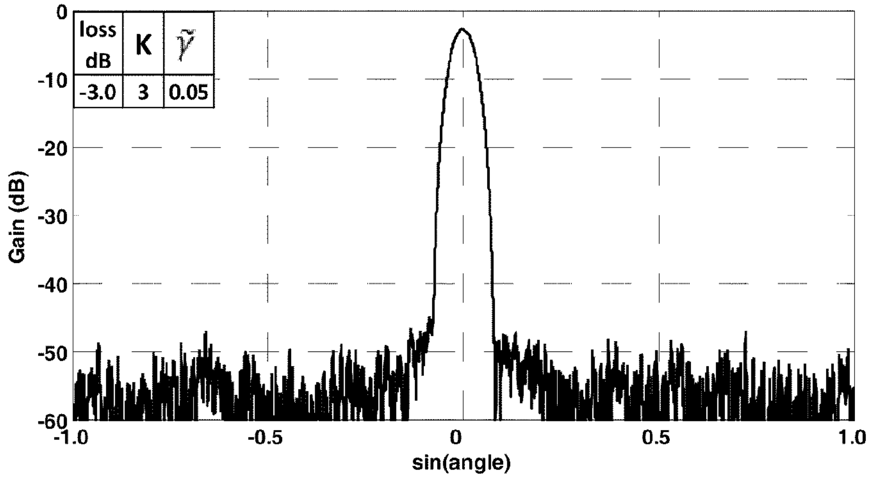
Figure 7A:
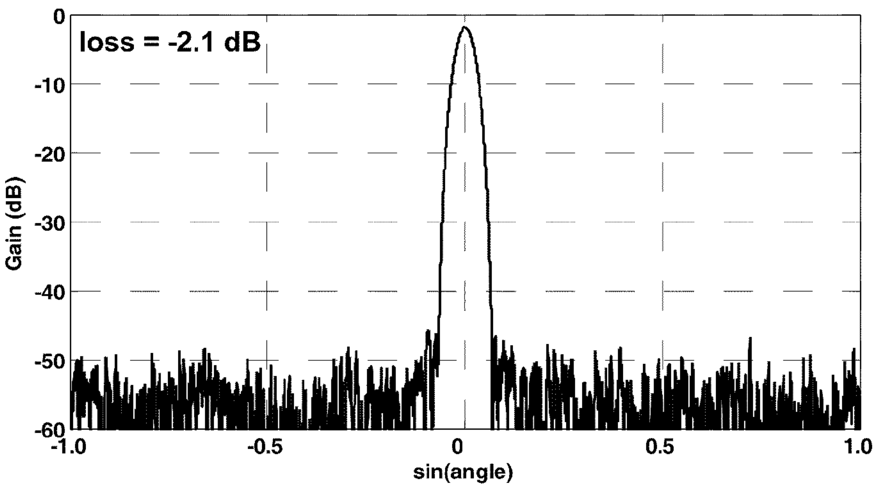
FIGS. 7A, 7B and 7C illustrate an antenna pattern for no failed antenna elements, an optimum antenna pattern achievable with a single failed element, #32, and a corrected antenna pattern achieved using the method of FIG. 3, respectively.
Figure 7B:
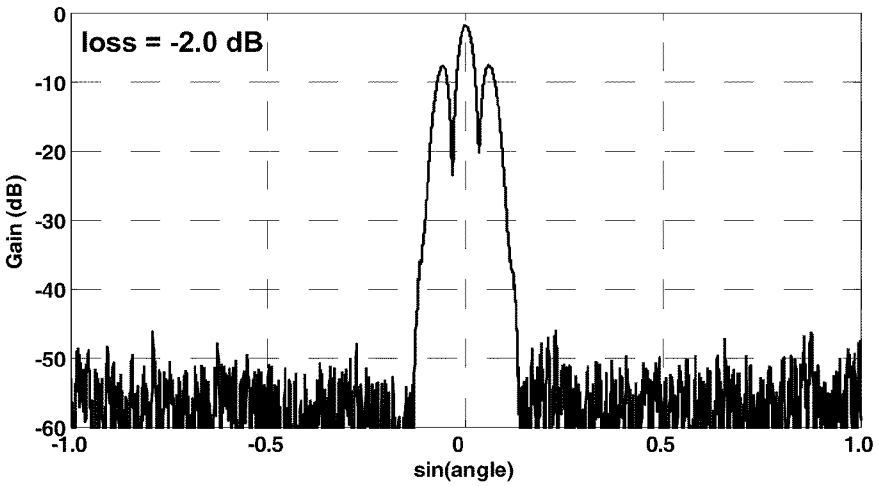
Figure 7C:
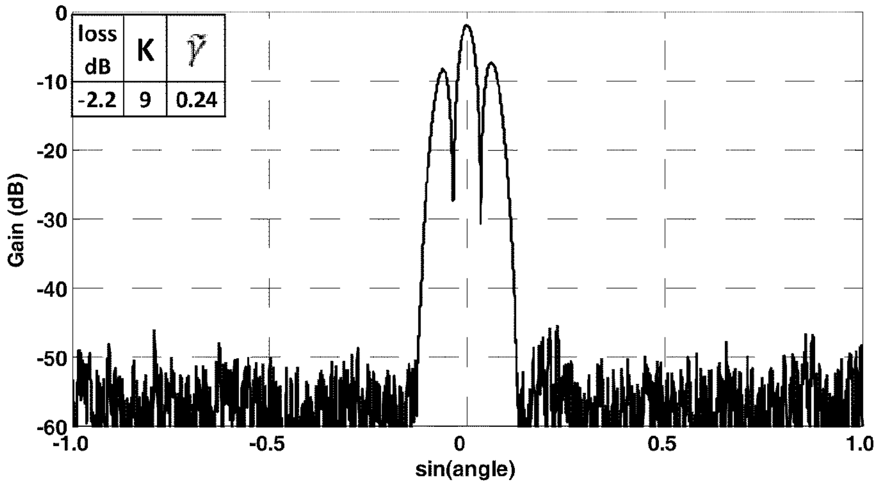

FIGS. 6A, 6B and 6C show the original antenna pattern for no failed antenna elements, the optimum antenna pattern than can be achieved with a single failed element (15) and the corrected antenna pattern that is achieved using the method 100 of FIG. 3, respectively. The optimum beamformer corresponding to the antenna pattern of FIG. 6B is defined as a beamformer according to Equation 1 where $v_a(\theta)=v_t(\theta)$, $\gamma$ is selected to maintain the sidelobe levels at −50 dB and $2\Delta$ is chosen to be the angular width of the K beams used by the method to determined the corrected beamformer. In this example, the corrected antenna pattern is determined for K=3 and $\tilde{\gamma}$=0.05, and results in a taper loss of −3.0 dB. In a similar manner, FIGS. 7A, 7B and 7C show the original antenna pattern for no failed antenna elements, the optimum antenna pattern that can be achieved with a single failed element (32) and the corrected antenna pattern that is achieved using the method 100, respectively. The corrected antenna pattern is determined for K=9 and γ=0.24, and results in a taper loss of −2.2 dB.

Figure 8A:
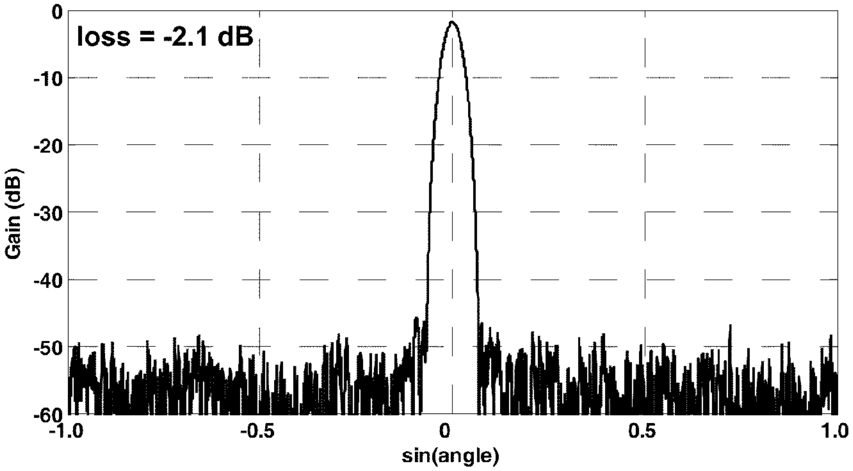
FIGS. 8A, 8B and 8C show an original antenna pattern for no failed antenna elements, an optimum antenna pattern achievable with three failed elements, #15, 32, and 53, and a corrected antenna pattern resulting from the method of FIG. 3, respectively.
Figure 8B:
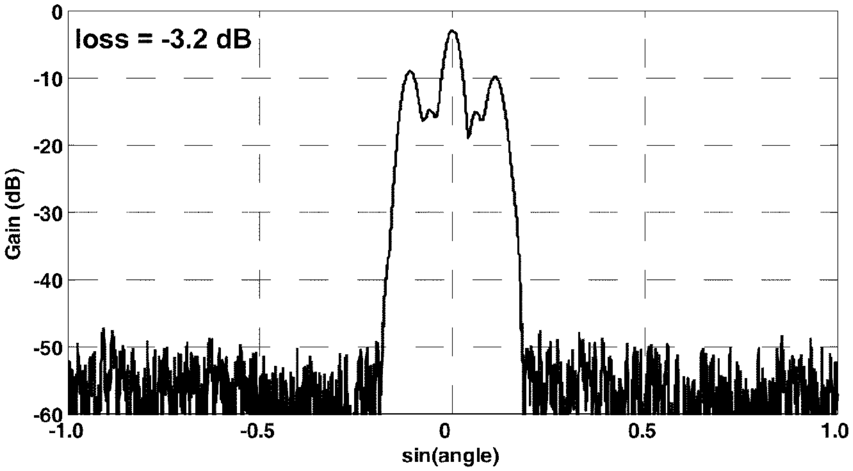
Figure 8C:
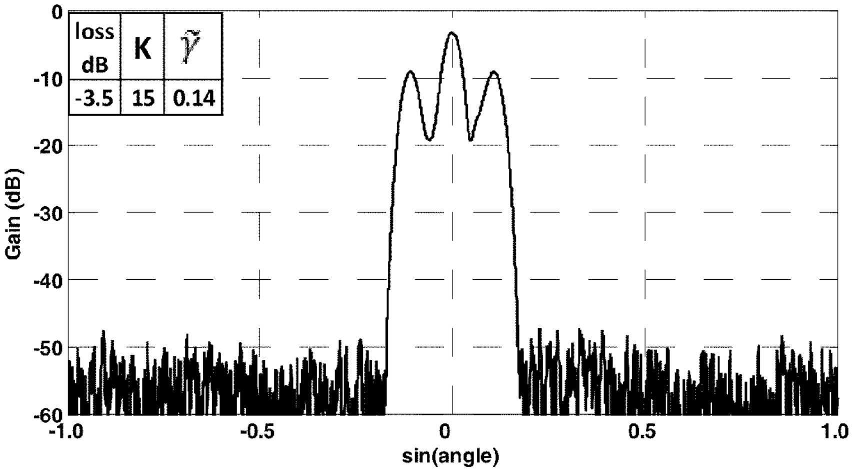

FIGS. 8A, 8B and 8C show the original antenna pattern for no failed antenna elements, the optimum antenna pattern achievable with three failed elements (15, 32, 53) and the corrected antenna pattern resulting from the method 100, respectively. In this example, the corrected antenna pattern is determined for K=15 and $\tilde{\gamma}$=0.14, and results in a taper loss of −3.5 dB.

Figure 9A:
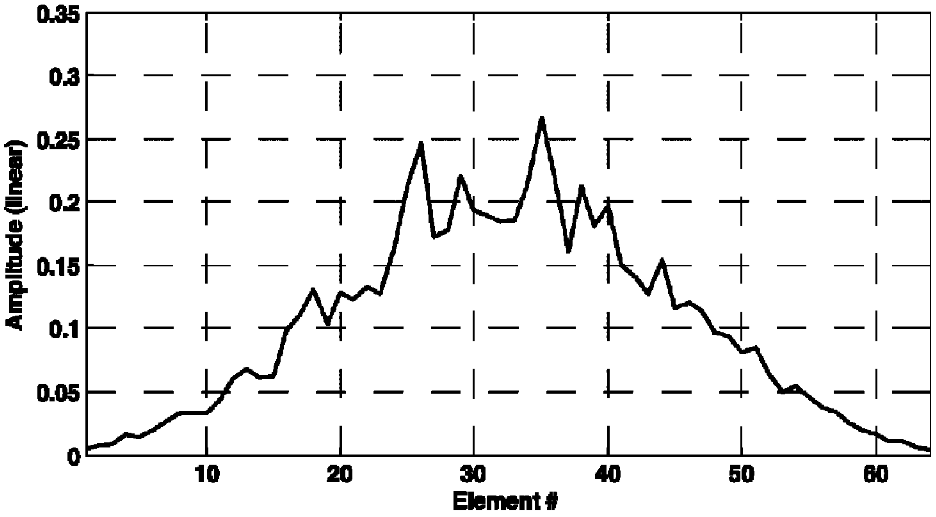
FIG. 9A illustrates the amplitudes of each component of a weight vector for a phased array having no failed elements.

FIG. 9A shows the amplitudes of each component of the weight vector $\hat{w}$ for no failed elements. The jagged nature of the amplitudes as a function of element index number is a result of the modeling of the antenna element errors.

Figure 9B:
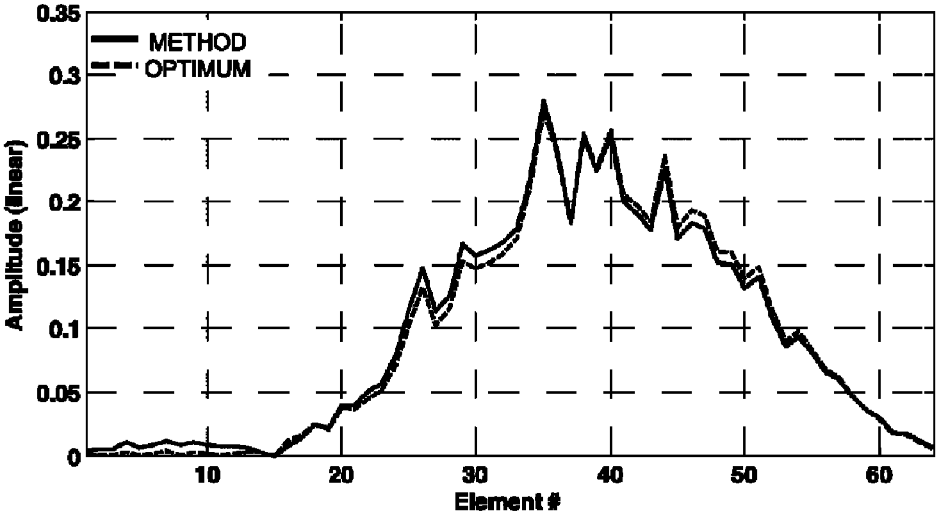
FIGS. 9B, 9C and 9D illustrate the amplitudes for each component of a corrected beamformer weight vectors and for each component of an optimum weight vector for each of FIGS. 6B and 6C, FIGS. 7B and 7C, and FIGS. 8B and 8C, respectively.
Figure 9C:
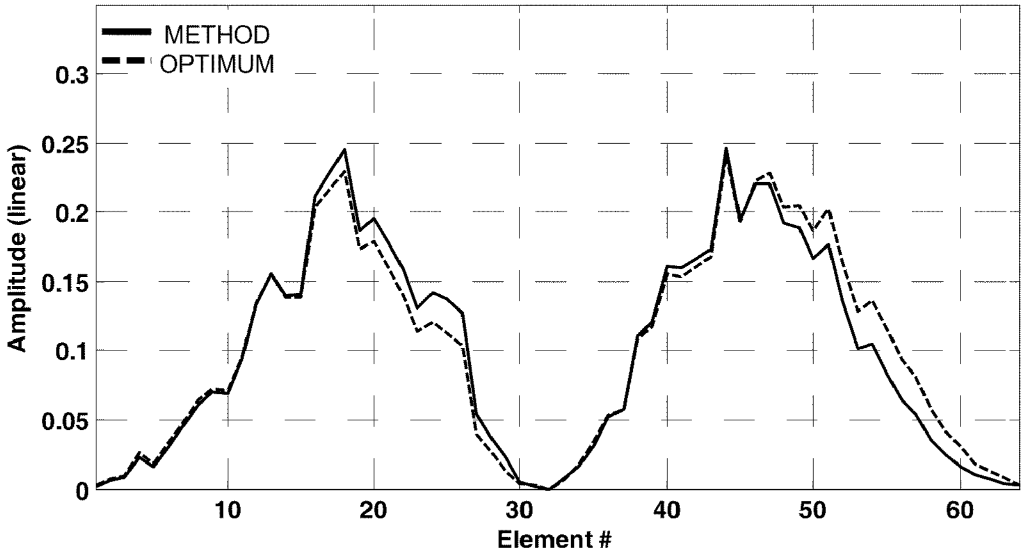
Figure 9D:
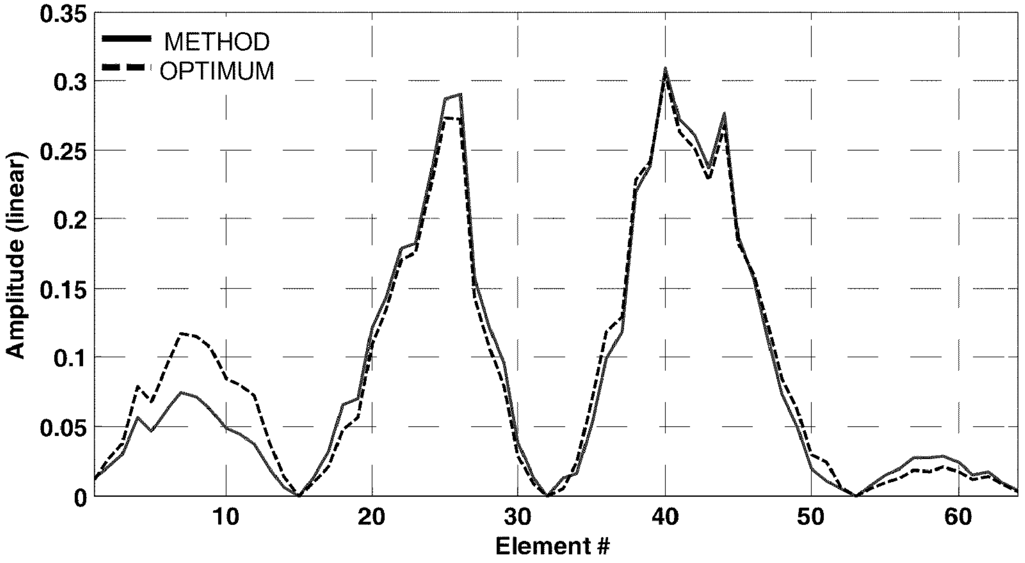

FIGS. 9B, 9C and 9D show the amplitudes for each component of the corrected beamformer weight vectors $\hat{w}$ and for each component of an optimum weight vector for each of FIGS. 6B and 6C, FIGS. 7B and 7C, and FIGS. 8B and 8C, respectively. In each case, it can be seen that the amplitude for a component of the weight vector that corresponds to a failed antenna element is zero and that the amplitudes of the components of the corrected beamformer weight vectors $\hat{w}$ are similar to the amplitudes of the components of the optimum weight vectors.

Figure 10A:
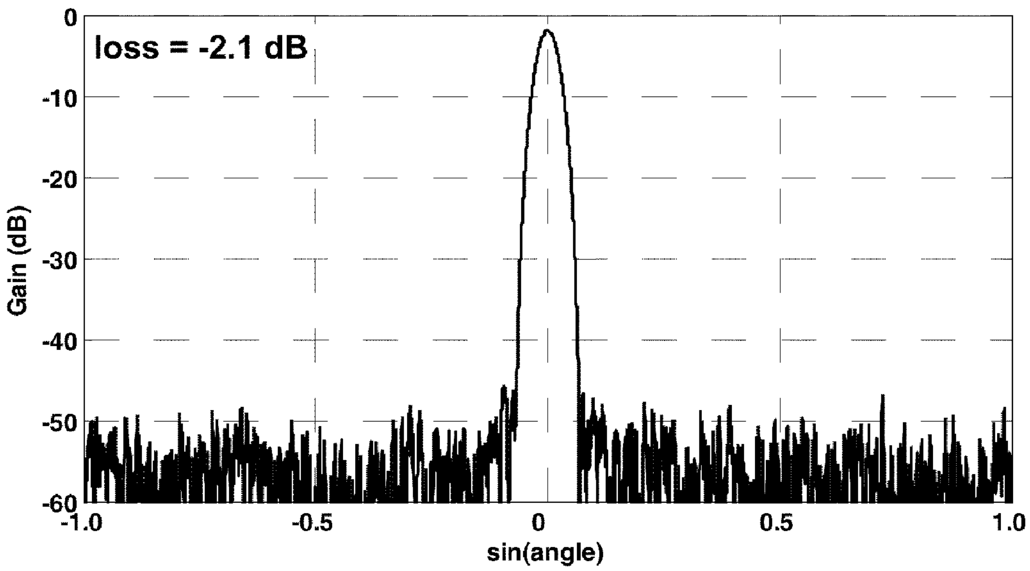
FIGS. 10A and 10B show the antenna patterns for a linear array having no failed elements and having a single failed element, respectively, based on application of the method of FIG. 4.
Figure 10B:
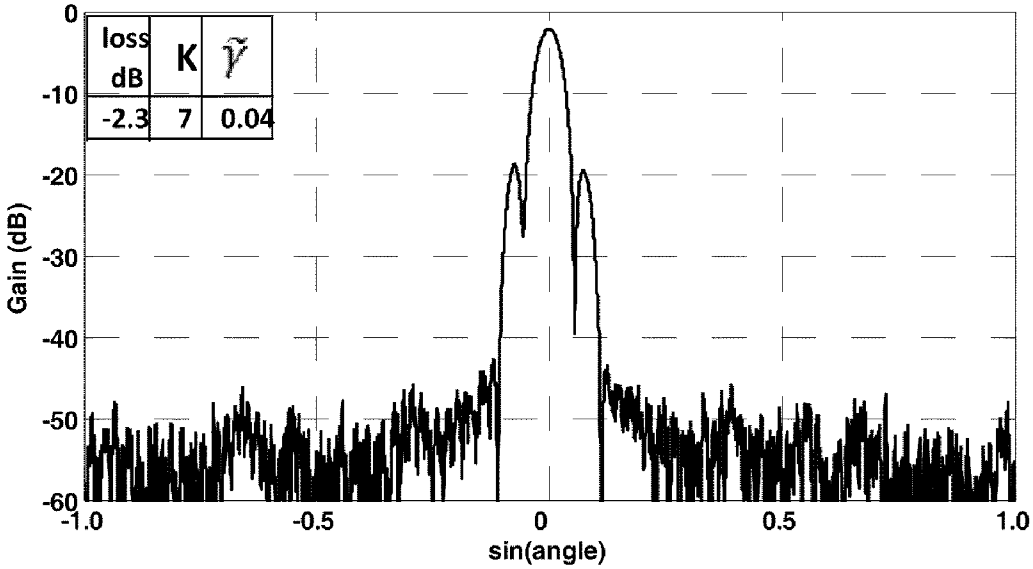

FIG. 10A shows the antenna pattern for a linear array having no failed elements and FIG. 10B shows an example in which element 15 of the linear array is a failed antenna element. In this example, application of the method 200 of FIG. 4 results in a minor degradation of the taper loss to −2.3 dB. This example can be contrasted with the antenna pattern shown in FIG. 6 for the same single dead element (15) in the linear array in which the method 100 of FIG. 3 is applied. It can be seen in FIG. 10B that the taper loss has been "improved" by 0.7 dB; however, the corrected antenna pattern has high first sidelobes and a 3 dB increase in the average sidelobe level.

Figure 11A:
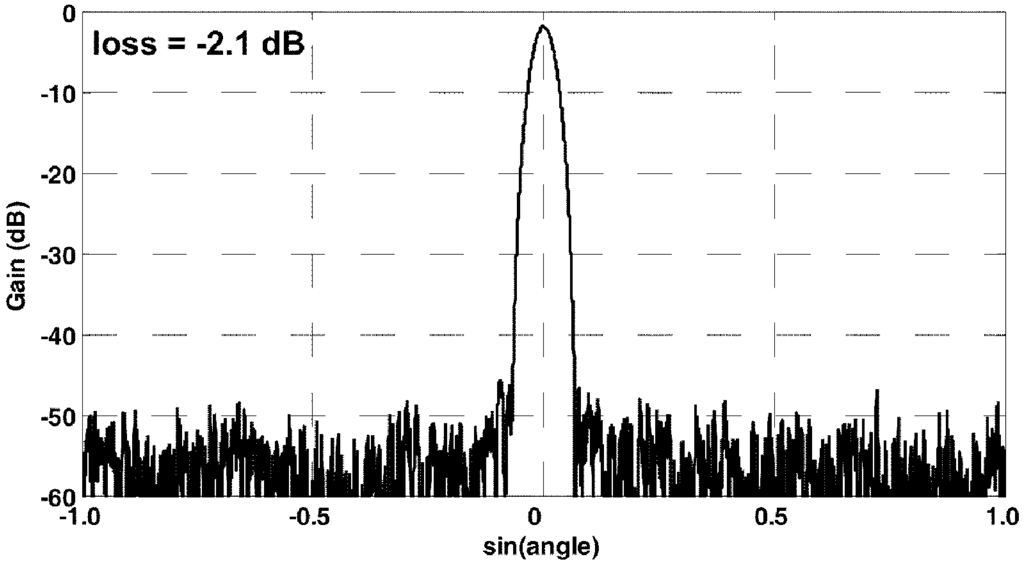
FIG. 11A shows the antenna pattern for no failed elements under normal operation and FIG. 11B shows the antenna pattern achieved using the method of FIG. 4 to achieve a reduction in taper loss.
Figure 11B:
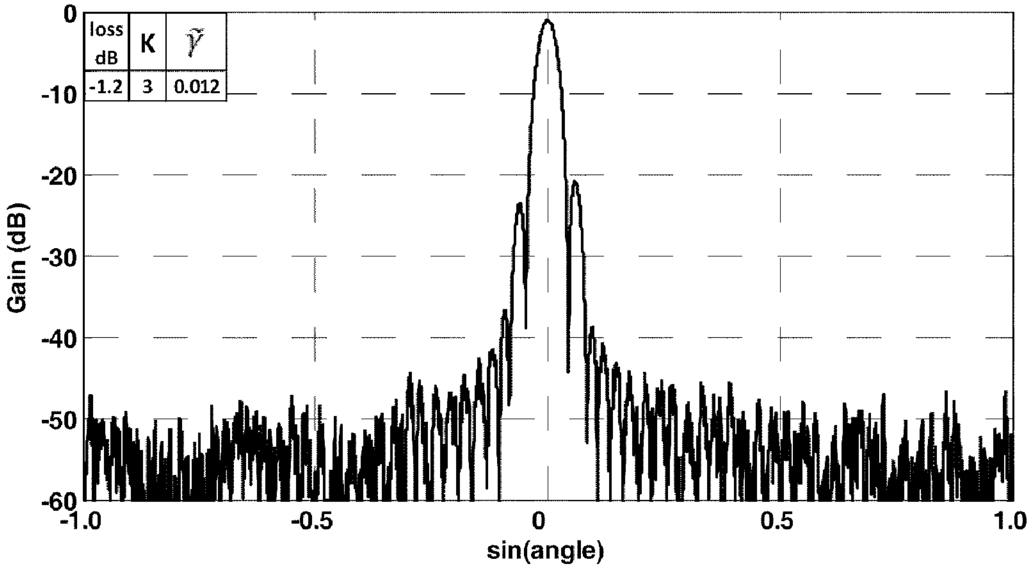

Although the examples above relate primarily to applications of the methods to arrays having one or more failed antenna elements, the methods can be applied in other applications in which no failed antenna elements are present in the array. In particular, it may be desirable to dynamically control the taper loss or sidelobe level according to the local environment. FIG. 11A shows the antenna pattern for no failed elements under normal operation while FIG. 11B shows the antenna pattern achieved using method 200 of FIG. 4 to achieve a reduction of 0.9 dB in the taper loss. The antenna pattern has high sidelobe levels near the mainlobe while the sidelobe levels farther away from the mainlobe are substantially unchanged. It will be appreciated that other values of K and $\tilde{\gamma}$ result in different changes to the antenna pattern.

Example Based on a 16×16 Element Array

Figure 12:
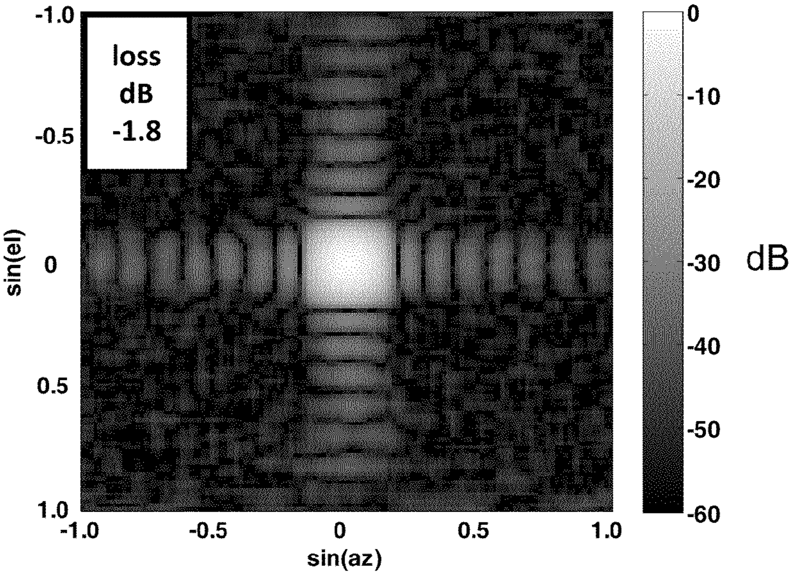
FIG. 12 shows an example of a low sidelobe pattern for a 16×16 array.

The following example illustrates the application of an embodiment of the method to a 16×16 array. Array errors are modeled in the same manner as the one-dimensional examples described above with errors correlated in both dimensions. Referring to FIG. 12, a low sidelobe pattern for the array has values of −39 dB on the cardinal axes and −52 dB off the cardinal axes.

Figure 13:
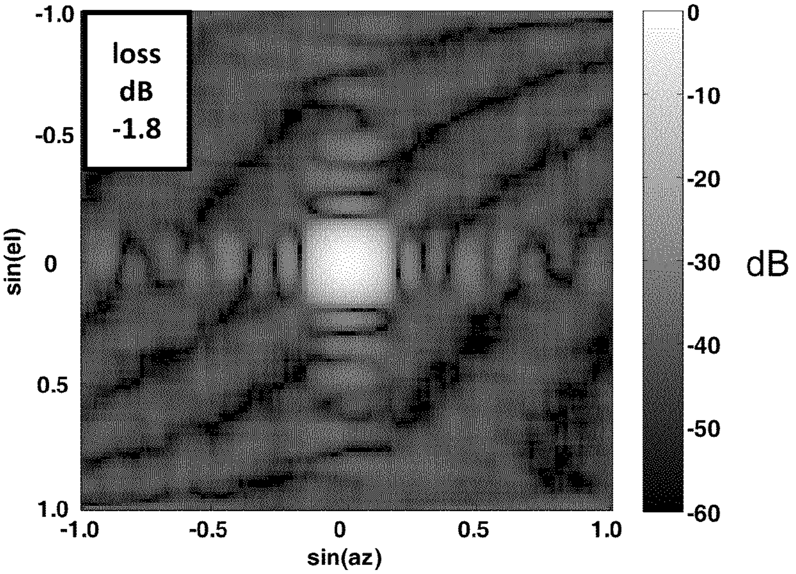
FIG. 13 shows an uncorrected antenna pattern for a 16×16 array having two failed antenna elements.
Figure 14:
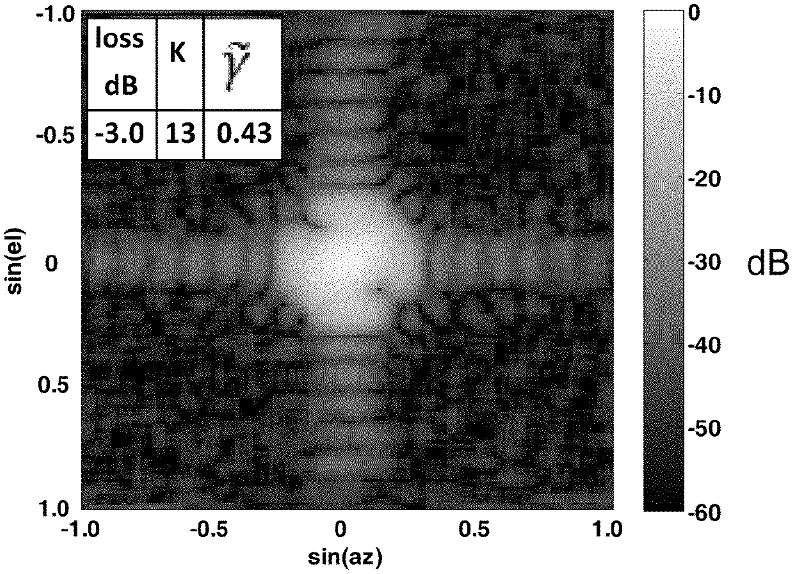
FIG. 14 shows a corrected antenna pattern achieved according to the method of FIG. 3 where the goal is to match the original sidelobe levels for the 16×16 array with no failed antenna elements.

FIG. 13 shows the uncorrected antenna pattern for two failed antenna elements (4,8) and (8,12). FIG. 14 shows the corrected antenna pattern achieved according to the method 100 of FIG. 3 in which the goal is to match the original sidelobe levels (i.e., 6 is set to a value of one). In this example, a two-dimensional grid of 13 proximate beamformers having a one-half beamwidth spacing are used with $\tilde{\gamma}$=0.43. The sidelobe levels are substantially unchanged off the cardinal axes and are raised by approximately 2 dB on the cardinal axes. The taper loss is increased from −1.8 dB to −3.0 dB. The taper loss can be reduced by using a greater number K of proximate beamformers. For example, a taper loss of −1.9 dB is achieved with similar sidelobe levels for K=25; however, greater "near in" sidelobe levels are present.

Figure 15:
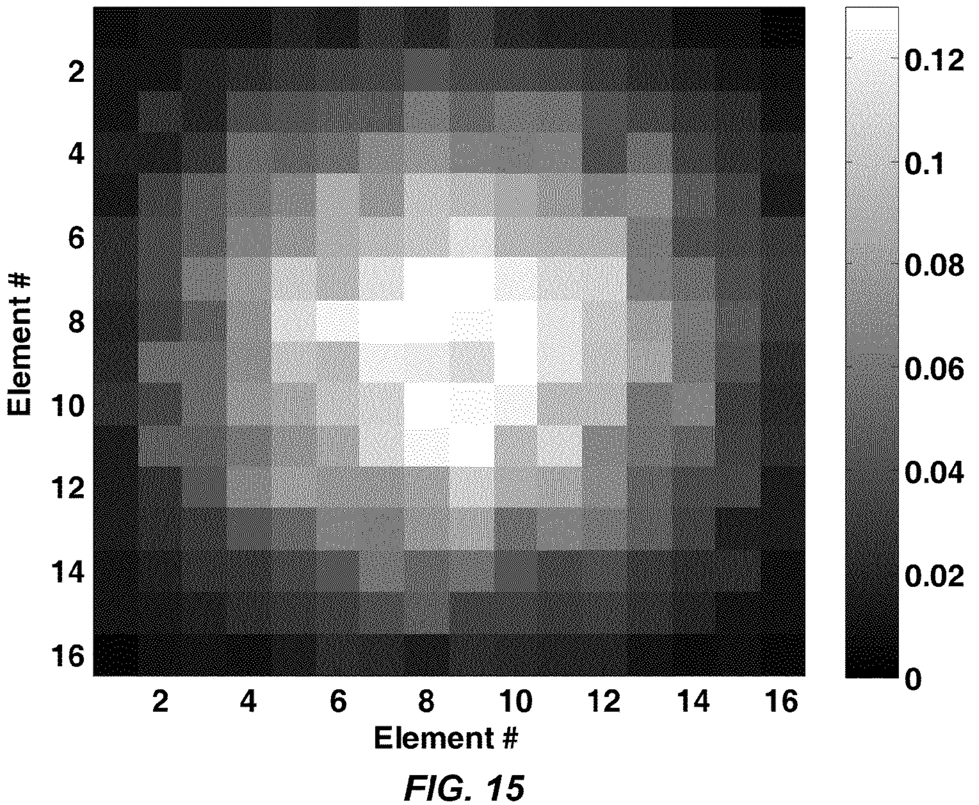
FIG. 15 shows beamformer amplitudes for each element of the 16×16 array with no failed antenna elements.

FIG. 15 depicts the beamformer amplitudes for each element of the 16×16 array without any failed elements. The jagged structure of the amplitudes is due to the nature of the antenna element errors.

Figure 16:
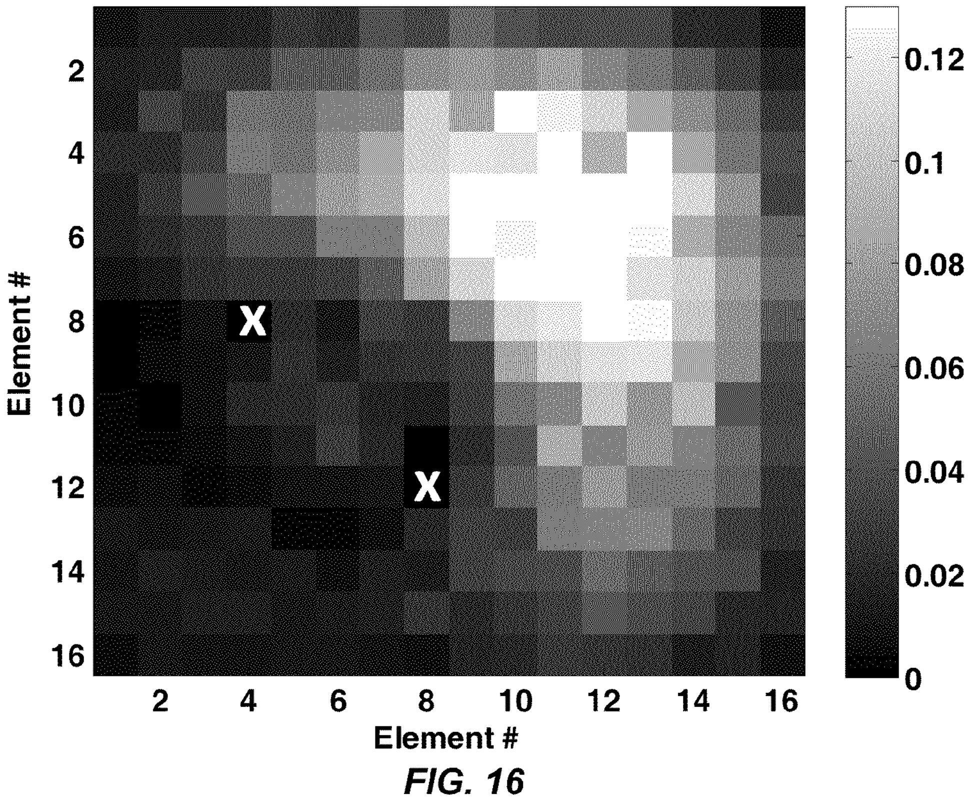
FIG. 16 shows the beamformer amplitudes applied to the 16×16 array for the corrected antenna pattern of FIG. 14 with an "x" indicating the location of the two failed elements.

FIG. 16 depicts the beamformer amplitudes applied to the array for the corrected antenna pattern for the failed elements (4,8) and (8,12). "x" denotes the location of each failed antenna element. The method 100 results in generally greater amplitudes for antenna elements in the upper right portion of the array.

Embodiments of the methods described above have been described with respect to antenna arrays having one or more failed antenna elements. The invention also includes a method of obtaining low Doppler sidelobe operation for a pulse-Doppler radar. More specifically, when one or more pulses subject to severe interference must be dropped, low Doppler sidelobe levels are desired to be maintained. In a mathematical sense, the one or more missing pulses are analogous to the failed antenna elements and Doppler filters are analogous to the low sidelobe beamformers previously described. The method applied to the pulses allows for rapid and predictable results for taper loss and Doppler sidelobe level. Moreover, as calibration is generally not an issue for a pulse-Doppler application, it may be preferable to apply Equation 3 instead of the approximation given by Equation 6 for the covariance matrix.

Alternatively, it should be appreciated that temporal samples in the range domain can experience interference and low range sidelobes can be required even though one or more temporal samples may be dropped. In this embodiment, the pulse compression filter is the mathematical equivalent of the low sidelobe beamformers.

Alternative Embodiments of the Methods (1) If the calibration errors $\epsilon(\theta)$ are significantly large so that the assumed steering vector $v_a(\theta)$ is effectively unknown, the weight vector $w(\theta)$ can be used to replace $v_a(\theta)$ in Equation 5. In this instance, knowledge of the steering vectors is not needed.

(2) Equation 5 can be interpreted wherein $\tilde{\gamma}$ regularizes the matrix $V^H V$ and decreases the contribution of the eigenvectors corresponding to the small eigenvalues. An alternative means to accomplish the same result is to set $\tilde{\gamma}$ equal to zero so that $\hat{w}(\theta)=V[V^H V]^{-1}V^H v_a(\theta)$. The matrix $V^H V$ can be modified such that the eigenvectors are unchanged but the small eigenvalues are increased.

(3) The matrix V can be defined as V=L principal singular vectors$[W_K \mathrm{null}(W_K(D,:))]$ where L is less than K−J. The columns of V are orthonormal thus Equation 6 can be simplified to $\hat{w}(\theta)=VV^H v_a(\theta)$.

(4) A matrix U is defined with columns that are the L principal singular vectors of $W_K$. Matrix V is then defined as V=U null(U(D,:)) for Equation 5.

(5) For a plurality of failed antenna elements the correction can be determined on a one element at a time basis by setting J equal to one and repeating the correction a number of times according to the total number of failed antenna elements. For each iteration, the number of failed antenna elements is effectively reduced by one. In this manner, different values of K and $\tilde{\gamma}$ are allowed for correcting for the different failed antenna elements.

While the invention has been shown and described with reference to specific embodiments, it should be understood by those skilled in the art that various changes in form and detail may be made therein without departing from the spirit and scope of the invention.

What is claimed is:

1. A method of modifying an antenna pattern for a phased array antenna having at least one failed antenna element, the method comprising:

determining a plurality of proximate beamformers in a proximate angular region about a beamformer at an angle of interest wherein each of the proximate beamformers has a proximate beamformer weight vector with no failed elements and wherein the number of determined proximate beamformers is greater than a total number of the failed antenna elements; and determining a corrected beamformer weight vector at the angle of interest as a linear combination of the proximate beamformer weight vectors, each element of the corrected beamformer weight vector corresponding to one of the failed antenna elements having a value of zero.

2. The method of claim 1 wherein determining a corrected beamformer weight vector comprises determining a coefficient for each of the proximate beamformer weight vectors.

3. The method of claim 1 wherein the proximate angular region comprises a plurality of low sidelobe beamformers each having a spacing to at least one of the other beamformers of less than a beamwidth.

4. The method of claim 1 wherein the beamformer and the proximate beamformers are each defined for a respective plurality of antenna elements in a phased array antenna.

5. The method of claim 4 wherein the phased array antenna comprises a subsystem in one of a radar system, a communication system and a sonar system.

6. The method of claim 1 wherein the determination of a corrected beamformer weight vector at the angle of interest is based on satisfying a target value for a change in an average sidelobe estimate and a predetermined maximum acceptable taper loss.

7. The method of claim 1 wherein the determination of a corrected beamformer weight vector at the angle of interest is based on satisfying a target value for a taper loss and a predetermined maximum value for a change in an average sidelobe estimate.

8. The method of claim 1 wherein an odd number of the proximate beamformers are linearly combined.

9. A method of modifying an antenna pattern of a phased array antenna having at least one failed antenna element, the method comprising:

for a beamformer having low sidelobes and defined for an angular direction θ, wherein at least one antenna element in a plurality of antenna elements coupled to the beamformer is a failed antenna element, determining a corrected beamformer having a corrected beamformer weight vector $\hat{w}(\theta)$ for the angular direction θ as $$\hat{w}(\theta) = \sum_{i=-k}^{k} a_i \; w(\theta_i)$$

where $w(\theta_i)$ denotes a beamformer weight vector for each proximate beamformer in a plurality of proximate beamformers having low sidelobes and being within a proximate angular region of the angular direction θ, wherein each element of the corrected beamformer weight vector $\hat{w}(\theta)$ that corresponds to a respective one of the failed antenna elements has a value of zero and wherein the number 2k+1 of determined proximate beamformers is greater than a total number of the failed antenna elements.

10. A method of determining a modified beamformer for a phased array antenna, the method comprising:

(a) selecting a target value for a change in an average sidelobe estimate for a modified beamformer for a phased array antenna;

(b) selecting a value for a maximum taper loss for the modified beamformer;

(c) determining the modified beamformer as a linear combination of a number of proximate beamformers defined according to an absence of failed antenna elements;

(d) determining the change in the average sidelobe estimate based on the modified beamformer;

(e) if the change in the average sidelobe estimate for the modified beamformer exceeds the selected target value, repeating steps (c) and (d) until the change in the average sidelobe estimate does not exceed the selected target value, wherein the number of proximate beamformers used to determine the modified beamformer is increased for each repetition of steps (c) and (d); and (f) if the taper loss for the modified beamformer exceeds the selected value for the maximum taper loss, repeating steps (c) to (e) until the taper loss for the modified beamformer does not exceed the selected value for the maximum taper loss, wherein the number of proximate beamformers used to determine the modified beamformer is increased for each repetition of steps (c) to (e).

11. The method of claim 10 wherein the phased array antenna has at least one failed antenna element coupled to a beamformer to be modified.

12. The method of claim 11 wherein the number of proximate beamformers in the linear combination is greater than the number of failed antenna elements.

13. The method of claim 10 wherein the number of proximate beamformers in the linear combination is an odd number.

14. The method of claim 10 wherein each of the proximate beamformers is spaced from at least one of the other beamformers by less than a beamwidth.

15. The method of claim 10 wherein the phased array antenna is a subsystem in one of a radar system, a communication system and a sonar system.

16. A method of determining a modified beamformer for a phased array antenna, the method comprising:

(a) selecting a target value for a taper loss for a modified beamformer for a phased array antenna;

(b) selecting a maximum value for a change in an average sidelobe estimate for the modified beamformer;

(c) determining the modified beamformer as a linear combination of a number of proximate beamformers defined according to an absence of failed antenna elements;

(d) determining the taper loss based on the modified beamformer; and (e) if the taper loss for the modified beamformer exceeds the selected target value, repeating steps (c) and (d) until the taper loss does not exceed the selected target value, wherein the number of proximate beamformers used to determine the modified beamformer is increased for each repetition of steps (c) and (d); and (f) if the change in the sidelobe estimate for the modified beamformer exceeds the maximum value, repeating steps (c) to (e) until the change in the sidelobe estimate for the modified beamformer does not exceed the maximum value, wherein the number of proximate beamformers used to determine the modified beamformer is increased for each repetition of steps (c) to (e).

17. The method of claim 16 wherein the phased array antenna has at least one failed antenna element coupled to a beamformer to be modified.

18. The method of claim 17 wherein the number of proximate beamformers in the linear combination is greater than the number of failed antenna elements.

19. The method of claim 16 wherein the number of proximate beamformers in the linear combination is an odd number.

20. The method of claim 16 wherein each of the proximate beamformers is spaced from at least one of the other beamformers by less than a beamwidth.

21. The method of claim 16 wherein the phased array antenna is a subsystem in one of a radar system, a communication system and a sonar system.

22. A computer program product for determining a modified antenna pattern for a phased array antenna having at least one failed antenna element, the computer program product comprising:

a non-transitory computer readable storage medium having computer readable program code embodied therewith, the computer readable program code comprising:

computer readable program code configured to determine a plurality of proximate beamformers for a phased array antenna in a proximate angular region about a beamformer at an angle of interest and having at least one failed antenna element, wherein each of the proximate beamformers has a proximate beamformer weight vector and wherein the number of determined proximate beamformers is greater than a total number of the failed antenna elements;

computer readable program code configured to determining a corrected beamformer weight vector for the phased array antenna at the angle of interest as a linear combination of the proximate beamformer weight vectors, each element of the corrected beamformer weight vector corresponding to one of the failed antenna elements having a value of zero; and computer readable program code configured to apply the corrected beamformer weight vector to a plurality of signals being received from or transmitted by the phased array antenna.

23. The computer program product of claim 22 wherein the computer readable program code configured to determine a corrected beamformer weight vector is configured to satisfy a target value for a change in an average sidelobe estimate and a predetermined maximum acceptable taper loss.

24. The computer program product of claim 22 wherein the computer readable program code configured to determine a corrected beamformer weight vector at the angle of interest is configured to satisfy a target value for a taper loss and a predetermined maximum value for a change in an average sidelobe estimate.

* * * * *